United States Patent
Takeuchi et al.

(10) Patent No.: US 9,346,214 B2
(45) Date of Patent: May 24, 2016

(54) FILM-FORMING COMPOSITION FOR OPTICAL IMPRINT AND METHOD FOR PRODUCING OPTICAL MEMBER

(71) Applicant: Tokyo Ohka Kogyo Co., Ltd., Kawasaki-shi (JP)

(72) Inventors: Hiroaki Takeuchi, Kawasaki (JP); Yoshinori Sakamoto, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 438 days.

(21) Appl. No.: 13/793,293

(22) Filed: Mar. 11, 2013

(65) Prior Publication Data
US 2013/0241092 A1  Sep. 19, 2013

(30) Foreign Application Priority Data

Mar. 15, 2012 (JP) .................. 2012-058574

(51) Int. Cl.
| | |
|---|---|
| *B29C 59/16* | (2006.01) |
| *C08F 22/10* | (2006.01) |
| *C08F 22/38* | (2006.01) |
| *C09D 4/00* | (2006.01) |
| *C08F 220/56* | (2006.01) |
| *C08F 222/10* | (2006.01) |

(52) U.S. Cl.
CPC ................. *B29C 59/16* (2013.01); *C08F 22/10* (2013.01); *C08F 22/38* (2013.01); *C09D 4/00* (2013.01); *C08F 220/56* (2013.01); *C08F 222/1006* (2013.01)

(58) Field of Classification Search
CPC .............. C08F 2/44; C08F 2/48; B29C 59/16
USPC ................................ 264/1.38; 522/6; 428/323
See application file for complete search history.

(56) References Cited

U.S. PATENT DOCUMENTS 6,570,714 B2 * 5/2003 Soane ..................... B32B 27/00
264/1.1

FOREIGN PATENT DOCUMENTS

| JP | 2008-202022 A | | 9/2008 |
|---|---|---|---|
| JP | 2008202022 A | * | 9/2008 |
| JP | 2009-206197 A | | 9/2009 |
| WO | WO 2009/145061 A1 | | 12/2009 |

OTHER PUBLICATIONS

Sakida et al. (JP 2008202022 A), Machine Translation JAP to ENG.*
Sakida et al. (JP 2008202022 A), Abstract.*
Office Action in Japanese Patent Application No. 2012-058574, mailed Nov. 17, 2015.

* cited by examiner

*Primary Examiner* — Alison L Hindenlang
*Assistant Examiner* — Lawrence D Hohenbrink, Jr.
(74) *Attorney, Agent, or Firm* — Knobbe Martens Olson & Bear LLP

(57) ABSTRACT

A film-forming composition for optical imprint including (A) a photopolymerizable monomer having a hydrophilic group, (B) inorganic nanoparticles, and (C) a photopolymerization initiator, and the composition has an organic solvent content of 20% by mass or less, contains a monomer having a viscosity of 500 cP or less as component (A) at a proportion of 30% by mass or more relative to the total amount of component (A) and component (B), and has a refractive index after curing of 1.56 or higher.

8 Claims, No Drawings

FILM-FORMING COMPOSITION FOR OPTICAL IMPRINT AND METHOD FOR PRODUCING OPTICAL MEMBER

This application claims priority under 35 U.S.C. §119(a)-(d) to Japanese Patent Application No. 2012-058574, filed on Mar. 15, 2012, the entire content of which is incorporated herein by reference.

BACKGROUND OF THE INVENTION

1. Field of the Invention

The present invention relates to a film-forming composition for optical imprint and a method for producing an optical member.

2. Related Art

Lithographic technologies are core technologies for semiconductor device processes, and along with the high integration of semiconductor integrated circuits (IC's) of recent years, further micronization of wiring is in progress. In particular, in regard to semiconductor integrated circuits (IC's) called ultra-LSIs having a degree of device integration as high as over ten million, microfabrication lithographic technologies are essential.

Here, as the microfabrication lithography technologies for realizing ultra-LSI, optical exposure lithography by means of KrF laser, ArF laser, $F_2$ laser, X rays, far-ultraviolet radiation or the like has been used heretofore. Furthermore, these optical exposure lithography technologies have enabled the formation of patterns in the order of several tens of nanometers (nm).

However, since devices used for the optical exposure lithography techniques are expensive, initial cost for the exposure devices has been increased with the further miniaturization. Moreover, a mask for obtaining a high resolution at the same level as a light wavelength is necessary for the optical exposure lithography, and the mask having such a microshape has been expensive. Furthermore, since the demand for higher integration is limitless, further miniaturization is required.

One of the technologies that have been developed under such circumstances is optical nanoimprint lithography. This is a technology for transferring a pattern onto a resin layer by pressing a mold against a coating layer containing a photo-curable resin, subsequently irradiating the resin with ultraviolet radiation to cure the resin, and then separating the mold.

Conventionally, since liquid resin compositions containing an organic solvent are used at the time of forming a coating layer, a process of removing the organic solvent that is included in the coating layer by performing prebaking after application, is considered essential. However, when a resin substrate having excellent moldability is used as a substrate, there is a problem in that prebaking after application degrades the substrate.

Thus, a method has been proposed in which a particular component is incorporated into the resin composition to be applied so that the resin composition will have low viscosity in a solventless state or even when a small amount of an organic solvent is used, and the process of prebaking is not employed (see Patent Document 1). In Patent Document 1, it is considered preferable to adjust the content of the organic solvent to 3% by mass or less relative to the total amount of the composition, and in the Examples a method of mixing the various components of the composition, subsequently stirring the composition at room temperature before it is applied, and volatilizing the organic solvent is employed. Examples of the organic solvent used in this application include ethoxybutanol, isopropanol, methoxypropanol, methyl ethyl ketone, and methyl isobutyl ketone.

Patent Document 1: Japanese Unexamined Patent Application, Publication No. 2008-202022

SUMMARY OF THE INVENTION

However, when optical members and the like are produced by optical nanoimprint lithography, in order to prepare a resin composition which would exhibit a high refractive index after being cured, the amount of fine inorganic oxide particles incorporated cannot be reduced. Therefore, when a resin composition is prepared by using a commercially available solvent-dispersed sol, a significant amount of an organic solvent will be incorporated. However, volatilizing the organic solvent by stirring the resin composition at room temperature until the content of the organic solvent reaches 3% by mass or less, as described in the Examples of Patent Document 1, is not preferable because the operating time increases.

Thus, it is an object of the present invention to provide a film-forming composition for optical imprint that does not require removal of the organic solvent by performing prebaking after application, has a high refractive index, and is capable of carrying out satisfactory shape transfer, as well as a method for producing an optical member.

The inventors of the present invention conducted thorough investigations in order to achieve the object described above, and as a result they found that when a particular film-forming composition is used, the problems described above can be solved. Thus, the inventors finally completed the present invention. Specifically, the present invention provides the following.

According to a first aspect of the present invention, a film-forming composition for optical imprint, is provided, including (A) a photopolymerizable monomer having a hydrophilic group, (B) inorganic nanoparticles, and (C) a photopolymerization initiator, the composition including an organic solvent in a content of 20% by mass or less, containing, as component (A), a monomer with a viscosity of 500 cP or less at a proportion of 30% by mass or more relative to the total amount of component (A) and component (B), and having a refractive index after curing of 1.56 or higher.

According to a second aspect of the present invention, a method for producing an optical member by optical imprint lithography is provided, the method including applying the film-forming composition of the first aspect on a substrate to form a coating layer, and pressing a mold against the coating layer without heating; irradiating the coating layer with ultraviolet radiation to cure the coating layer while the mold is pressed against the coating layer, thereby forming a resin layer; and detaching the mold from the resin layer.

According to the present invention, a film-forming composition for optical imprint, which has no need for removal of an organic solvent by performing prebaking after application, has a high refractive index, and is capable of performing satisfactory shape transfer, and a method for producing an optical member by using such a film-forming composition, may be provided.

DETAILED DESCRIPTION OF THE INVENTION

Film-Forming Composition for Optical Imprint

The film-forming composition for optical imprint according to the present invention includes at least (A) a photopolymerizable monomer having a hydrophilic group, (B) inorganic nanoparticles, and (C) a photopolymerization initiator, and the composition has an organic solvent content of 20% by mass or less, contains a monomer having a viscosity of 500 cP or less as component (A) at a proportion of 30% by mass or more relative to the total amount of component (A) and component (B), and has a refractive index after curing of 1.56 or higher. Hereinafter, the various components that are included in the film-forming composition according to the present invention will be described in detail.

(A) Photopolymerizable Monomer Having Hydrophilic Group

The (A) photopolymerizable monomer having a hydrophilic group that is used in the present invention is a monomer having, as the hydrophilic group, at least one or more functional groups selected from a hydroxyl group, a carbonyl group, a carboxyl group, and an ester group. When a photopolymerizable monomer having these functional groups is used, a film-forming composition which exhibits excellent dispersibility and shape transferability may be obtained.

Examples of component (A) include monofunctional monomers and polyfunctional monomers.

Examples of the monofunctional monomers include (meth)acrylamide, methoxymethyl(meth)acrylamide, dimethylacrylamide, ethoxymethyl(meth)acrylamide, propoxymethyl(meth)acrylamide, butoxymethoxymethyl(meth)acrylamide, N-methylol(meth)acrylamide, N-hydroxymethyl(meth)acrylamide, (meth)acrylic acid, fumaric acid, maleic acid, maleic anhydride, itaconic acid, itaconic anhydride, citraconic acid, citraconic anhydride, crotonic acid, 2-acrylamido-2-methylpropanesulfonic acid, tert-butylacrylamidesulfonic acid, methyl(meth)acrylate, ethyl (meth)acrylate, butyl(meth)acrylate, 2-ethylhexyl(meth) acrylate, cyclohexyl(meth)acrylate, 2-hydroxyethyl(meth) acrylate, 2-hydroxypropyl(meth)acrylate, 2-hydroxybutyl (meth)acrylate, 2-phenoxy-2-hydroxypropyl(meth)acrylate, 2-(meth)acryloyloxy-2-hydroxypropyl phthalate, glycerin mono(meth)acrylate, tetrahydrofurfuryl(meth)acrylate, dimethylamino(meth)acrylate, glycidyl(meth)acrylate, 2,2,2-trifluoroethyl(meth)acrylate, 2,2,3,3-tetrafluoropropyl(meth) acrylate, half (meth)acrylate of a phthalic acid derivative, γ-butyrolactone methacrylate, acryloylmorpholine, and 2-hydroxy-3-phenoxypropyl acrylate.

On the other hand, examples of the polyfunctional monomers include polyfunctional monomers such as ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth) acrylate, 1,6-hexaneglycol di(meth)acrylate, trimethylolpropane tri(meth)acrylate, glycerin di(meth)acrylate, pentaerythritol di(meth)acrylate, pentaerythritol tri(meth) acrylate, pentaerythritol tetra(meth)acrylate, dipentaerythritol penta(meth)acrylate, dipentaerythritol hexa (meth)acrylate, 2,2-bis(4-(meth)acryloxydiethoxyphenyl) propane, 2,2-bis(4-(meth)acryloxypolyethoxyphenyl)propane, 2-hydroxy-3-(meth)acryloyloxypropyl(meth)acrylate, ethylene glycol diglycidyl ether di(meth)acrylate, diethylene glycol diglycidyl ether di(meth)acrylate, phthalic acid diglycidyl ester di(meth)acrylate, glycerin triacrylate, glycerin polyglycidyl ether poly(meth)acrylate, urethane(meth)acrylate (that is, tolylene diisocyanate), a reaction product of trimethylhexamethylene diisocyanate, hexamethylene diisocyanate and 2-hydroxyethyl(meth)acrylate, methylenebis (meth)acrylamide, (meth)acrylamide methylene ether, and a condensate of a polyhydric alcohol and N-methylol(meth) acrylamide; and triacrylformal.

As component (A), these monofunctional monomers and polyfunctional monomers can be used singly or in a combination of two or more kinds.

Component (A) is preferably an acrylic monomer.

Component (A) includes a monomer having a viscosity of 500 cP or less at a proportion of 30% by mass or more relative to the total amount of component (A) and component (B). Preferably, component (A) includes such a monomer in an amount greater than or equal to 50% by mass and less than 95% by mass, and more preferably in an amount greater than or equal to 65% by mass and less than 95% by mass. When a film-forming composition containing a monomer having a viscosity of 500 cP or less at a proportion in the range described above is employed, shape transfer may be carried out satisfactorily.

Examples of a monomer that is component (A) and that has a viscosity of 500 cP or less include dimethylacrylamide, γ-butyrolactone methacrylate, acryloylmorpholine, 2-hydroxy-3-phenoxypropyl acrylate, and pentaerythritol triacrylate.

The content of component (A) used in the present invention is preferably 5% to 95% by mass, and more preferably 30% to 90% by mass, relative to the amount of the components other than the organic solvent in the film-forming composition.

(B) Inorganic Nanoparticles

The inorganic nanoparticles (B) may increase the hardness of the cured product of the film-forming composition according to the present invention, may also increase the refractive index, and may impart excellent light resistance.

Component (B) is such that from the viewpoint of ensuring transparency of the cured film, the average particle size is preferably 500 nm or less, and more preferably 2 nm to 100 nm.

Component (B) used in the present invention is preferably fine particles of a metal oxide. Examples of the metal oxide include titanium oxide, zirconium oxide, aluminum oxide, barium titanate, cerium oxide, tin oxide, zinc oxide, tantalum oxide, manganese oxide, nickel oxide, iron oxide, silicon oxide, niobium oxide, lanthanum oxide, and gadolinium oxide. In particular, in order to increase the refractive index after curing of the film-forming composition, titanium oxide or zirconium oxide is preferred.

The content of component (B) used in the present invention is such that in order to adjust the refractive index after curing of the film-forming composition to 1.56 or higher, the content is preferably 5% to 90% by mass, and more preferably 10% to 70% by mass, relative to the amount of the components other than the organic solvent of the film-forming composition.

(C) Photopolymerization Initiator

The photopolymerization initiator (C) used in the present invention is not particularly limited, and may be appropriately selected in accordance with the kind of resin that is included in the film-forming composition, or with the kind of functional group. A photopolymerization initiator that is needed may be selected in accordance with the situation of the film-forming composition, such as from a photocation initiator, a photoradical initiator, and a photoanion initiator.

Examples of component (C) include 2,2-bis(2-chlorophenyl)-4,5,4',5'-tetraphenyl-1,2'-biimidazole (hereinafter, B-CIM (manufactured by Hodogaya Chemical Co., Ltd.)), 1-hydroxycyclohexyl phenyl ketone, 2,2-dimethoxy-1,2-diphenylethan-1-one, 2-methyl-1-[4-(methylthio)phenyl]-2-morpholinopropan-1-one, 2-benzyl-2-dimethylamino-1-(4-morpholinophenyl)-butan-1-one, 2-hydroxy-2-methyl-1-phenylpropan-1-one, 2,4,6-trimethylbenzoyldiphenylphosphine oxide, 1-[4-(2-hydroxyethoxy)phenyl]-2-hydroxy-2-methyl-1-propan-1- one, 2,4-diethylthioxanthone, 2,4-dimethylthioxanthone, 3,3-dimethyl-4-methoxybenzophenone, benzophenone, 2-chlorobenzophenone, 4,4'-bisdimethylaminobenzophenone (hereinafter, Michler's ketone), 4,4'-bisdiethylaminobenzophenone (hereinafter, EAB-F (manufactured by Hodogaya Chemical Co., Ltd.)), 1-(4-isopropylphenyl)-2-hydroxy-2-methylpropan-1-one, 1-(4-dodecylphenyl)-2-hydroxy-2-methylpropan-1-one, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 4-dimethylaminobenzoic acid-2-ethylhexyl ester, 4-dimethylaminobenzoic acid-2-isoamyl ester, acetophenone, 2,2-diethoxyacetophenone, p-methylacetophenone, p-dimethylaminopropiophenone, trichloroacetophenone, p-tert-butylacetophenone, benzyl dimethyl ketal, benzyl-β-methoxyethyl acetal, 1-phenyl-1,2-propanedione-2-(o-ethoxycarbonyl)oxime, methyl o-benzoylbenzoate, bis(4-dimethylaminophenyl)ketone, 4,4'-bisdiethylaminobenzophenone, benzil, benzoin, benzoin methyl ether, benzoin ethyl ether, benzoin isopropyl ether, benzoin-n-butyl ether, benzoin isobutyl ether, benzoin butyl ether, p-dimethylaminoacetophenone, 2-methylthioxanthone, 2-isopropylthioxanthone, dibenzosuberone, α,α-dichloro-4-phenoxyacetophenone, pentyl-4-dimethylaminobenzoate, and triazine compounds such as 2,4-bis(trichloromethyl)-6-(3-bromo-4-methoxy)phenyl-s-triazine and 2,4-bis(trichloromethyl)-6-(p-methoxy)styryl-s-triazine.

Furthermore, in addition to the compounds described above, sulfur compounds such as thioxanthone, 2-chlorothioxanthone, 2,4-diethylthioxanthene, 2-methylthioxanthene, and 2-isopropylthioxanthene; anthraquinones such as 2-ethylanthraquinone, octamethylanthraquinone, 1,2-benzanthraquinone, and 2,3-diphenylanthraquinone; organic peroxides such as azobisisobutyronitrile, benzoyl peroxide and cumene peroxide; thiol compounds such as 2-mercaptobenzoimidazole, 2-mercaptobenzoxazole, and 2-mercaptobenzothiazole; and the like may also be used.

Component (C) may be used singly, or two or more kinds may be used in combination. The amount of component (C) is not particularly limited, but it is preferable that component (C) be included in an amount of 0.1 to 30 parts by mass relative to 100 parts by mass of the film-forming composition. When component (C) is used in an amount in this range, photocurability is enhanced, and smoothness at the pattern surface thus formed tends to become satisfactory.

Organic Solvent

The film-forming composition according to the present invention may contain an organic solvent. The organic solvent that is used in the present invention may be any solvent that disperses or dissolves components (A), (B) and (C) or other components that will be described below, but that does not react with these components and has adequate volatility.

Examples of such an organic solvent include alcohols such as methanol, ethanol, propanol, and n-butanol; polyhydric alcohols such as ethylene glycol, diethylene glycol, propylene glycol, and dipropylene glycol; ketones such as acetone, methyl ethyl ketone, cyclohexanone, methyl-n-amyl ketone, methyl isoamyl ketone, and 2-heptanone; derivatives of polyhydric alcohols, such as compounds having ester bonds such as ethylene glycol monoacetate, diethylene glycol monoacetate, propylene glycol monoacetate and dipropylene glycol monoacetate, and compounds having ether bonds such as monoalkyl ethers such as monomethyl ethers, monoethyl ethers, monopropyl ethers and monobutyl ethers, or monophenyl ethers of polyhydric alcohols or compounds having ester bonds; cyclic ethers such as dioxane; esters such as methyl lactate, ethyl lactate, methyl acetate, ethyl acetate, butyl acetate, methyl pyruvate, ethyl pyruvate, methyl methoxypropionate, and ethyl ethoxypropionate; and aromatic organic solvents such as anisole, ethyl benzyl ether, cresyl methyl ether, diphenyl ether, dibenzyl ether, phenethol, butyl phenyl ether, ethylbenzene, diethylbenzene, amylbenzene, isopropylbeznene, toluene, xylene, cymene, and mesitylene. These can be used singly or in a combination of two or more kinds.

The content of the organic solvent is an amount capable of making both the coatability of the film-forming composition and the detachability of the mold satisfactory, and the content is 20% by mass or less of the film-forming composition. More preferably, the content is 5% to 15% by mass.

Other Components

The film-forming composition according to the present invention may also include a surfactant, as necessary. There are no particular limitations on the surfactant, and known components such as fluorine-based surfactants and silicone-based surfactants may be used. When a surfactant is incorporated, transferability of the mold shape becomes satisfactory.

Method for Producing Optical Member

The method for producing an optical member according to the present invention includes applying the film-forming composition according to the present invention on a substrate to form a coating layer, and pressing a mold against the coating layer without heating; irradiating the coating layer with ultraviolet radiation to cure the coating layer while the mold is pressed against the coating layer, thereby forming a resin layer; and detaching the mold from the resin layer.

First, the film-forming composition according to the present invention is applied on a substrate by a spin-coating method or the like, and a coating layer is formed. The thickness of the coating layer is preferably about 10 nm to 5 μm.

Furthermore, the substrate may be any substrate that is transparent, and examples thereof include a glass substrate and a resin substrate. However, a material having excellent moldability is particularly preferred, and translucent resin substrates of polycarbonate resins, acrylic resins, cycloolefin polymers, polystyrene resins, and functional norbornene-based resins are preferred.

Next, a mold having a predetermined shape is pressed against the coating layer formed on the substrate and, while in that state, the coating layer is cured by irradiating the coating layer with ultraviolet radiation. Thus, a resin layer is formed. The shape of the mold may thereby be transferred to the resin layer.

Thereafter, the mold is detached from the resin layer. As a result, an optical member having the shape of the mold transferred thereto is formed on the substrate. By changing the shape of the mold, optical members having various shapes may be produced.

In addition, a resin layer having the shape of the mold transferred thereto may also be heated and/or calcined, and be further cured.

In this manner, an optical member to which the shape of the mold has been transferred may be formed on the substrate. The optical member thus formed may be utilized as a light guide panel, an optical sheet, a planar light source apparatus, a microlens for CMOS sensors, or the like.

EXAMPLES

Hereinafter, the present invention will be described more specifically by way of Examples, but the present invention is not intended to be limited to these Examples.

Examples 1 to 10 and Comparative Examples 1 to 4

The various components indicated in Tables 1 to 3 were dispersed in propylene glycol monomethyl ether, and thus a film-forming composition was prepared. The numerical values in parentheses in Table 1 to 3 represent the parts by mass of the various components. The dispersibility of all the film-forming compositions thus prepared was satisfactory.

TABLE 1

|  | Example 1 | Example 2 | Example 3 | Example 4 | Example 5 |
|---|---|---|---|---|---|
| (A) Photopolymerizable monomer (a) having a hydrophilic group | DMAA (76.5) | GBLMA (76.5) | ACMO (76.5) | ARONIX M-5700 (76.5) | ARONIX M-305 (76.5) |
| Viscosity of monomer (a) | 1.3 | 4 | 12 | 150 | 300 |
| (A) Photopolymerizable monomer (b) having a hydrophilic group | KAYARAD DPHA (8.5) | KAYARAD DPHA (8.5) | KAYARAD DPHA (8.5) | KAYARAD DPHA (8.5) | KAYARAD DPHA (8.5) |
| Viscosity of monomer (b) | 6000 | 6000 | 6000 | 6000 | 6000 |
| (B) Inorganic nanoparticles | RTTPGM20WT %-N13 (15) | RTTPGM20WT %-N13 (15) | RTTPGM20WT %-N13 (15) | RTTPGM20WT %-N13 (15) | RTTPGM20WT %-N13 (15) |
| (C) Photopolymerization initiator | IR-907 (0.85) | IR-907 (0.85) | IR-907 (0.85) | IR-907 (0.85) | IR-907 (0.85) |
| Other components | PF656 (0.05) | PF656 (0.05) | PF656 (0.05) | PF656 (0.05) | PF656 (0.05) |
| Organic solvent content (mass %) | 15 | 15 | 15 | 15 | 15 |

TABLE 2

|  | Example 6 | Example 7 | Example 8 | Example 9 | Example 10 |
|---|---|---|---|---|---|
| (A) Photopolymerizable monomer (a) having a hydrophilic group | ARONIX M-451 (76.5) | ARONIX M-5700 (76.5) | ARONIX M-5700 (76.5) | ARONIX M-5700 (65) | ARONIX M-5700 (50) |
| Viscosity of monomer (a) | 500 | 150 | 150 | 150 | 150 |
| (A) Photopolymerizable monomer (b) having a hydrophilic group | KAYARAD DPHA (8.5) | KAYARAD DPHA (8.5) | KAYARAD DPHA (8.5) | (0) | (0) |
| Viscosity of monomer (b) | 6000 | 6000 | 6000 | — | — |
| (B) Inorganic nanoparticles | RTTPGM20WT %-N13 (15) | RTTPGM20WT %-N13 (15) | RTTPGM20WT %-N13 (15) | RTTPGM20WT %-N13 (35) | RTTPGM20WT %-N13 (50) |
| (C) Photopolymerization initiator | IR-907 (0.85) | IR-907 (0.85) | IR-907 (0.85) | IR-907 (0.65) | IR-907 (0.5) |
| Other components | PF656 (0.05) | PF656 (0.05) | PF656 (0.05) | PF656 (0.05) | PF656 (0.05) |
| Organic solvent content (mass %) | 15 | 10 | 20 | 15 | 15 |

TABLE 3

|  | Comparative Example 1 | Comparative Example 2 | Comparative Example 3 | Comparative Example 4 |
|---|---|---|---|---|
| (A) Photopolymerizable monomer (a) having a hydrophilic group | ARONIX M-5700 (76.5) | ARONIX M-306 (76.5) | LIGHT ACRYLATE PE-3A (76.5) | ARONIX M-215 (65) |
| Viscosity of monomer (a) | 150 | 550 | 700 | 8000 |
| (A) Photopolymerizable monomer (b) having a hydrophilic group | KAYARAD DPHA (8.5) | KAYARAD DPHA (8.5) | KAYARAD DPHA (8.5) | KAYARAD DPHA (8.5) |
| Viscosity of monomer (b) | 6000 | 6000 | 6000 | 6000 |

TABLE 3-continued

|  | Comparative Example 1 | Comparative Example 2 | Comparative Example 3 | Comparative Example 4 |
|---|---|---|---|---|
| (B) Inorganic nanoparticles | RTTPGM20WT %-N13 (15) | RTTPGM20WT %-N13 (15) | RTTPGM20WT %-N13 (15) | RTTPGM20WT %-N13 (15) |
| (C) Photopolymerization initiator | IR-907 (0.85) | IR-907 (0.85) | IR-907 (0.85) | IR-907 (0.85) |
| Other components | PF656 (0.05) | PF656 (0.05) | PF656 (0.05) | PF656 (0.05) |
| Organic solvent content (mass %) | 22.5 | 15 | 15 | 15 |

DMAA: Dimethylacrylamide
GBLMA: γ-Butyrolactone methacrylate
ACMO: Acryloylmorpholine
ARONIX M-5700: 2-Hydroxy-3-phenoxypropyl acrylate (manufactured by Toagosei Co., Ltd.)
ARONIX M-305: Pentaerythritol tri- and tetraacrylate (triacrylate = 55% to 63%, manufactured by Toagosei Co., Ltd.)
ARONIX M-451: Pentaerythritol tri- and tetraacrylate (triacrylate = 25% to 40%, manufactured by Toagosei Co., Ltd.)
ARONIX M-306: Pentaerythritol tri- and tetraacrylate (triacrylate = 65% to 70%, manufactured by Toagosei Co., Ltd.)
LIGHT ACRYLATE PE-3A: Pentaerythritol triacrylate (manufactured by Kyoeisha Chemical Co., Ltd.)
ARONIX M-215: Isocyanuric acid EO-modified diacrylate (manufactured by Toagosei Co., Ltd.)
RTTPGM20WT %-N13: Titanium oxide dispersion liquid (manufactured by CIK Nanotek Corp.)
IR-907: IRGACURE photopolymerization initiator (manufactured by Ciba Geigy Corp.)
KAYARAD DPHA: Dipentaerythritol penta- and hexaacrylate (manufactured by Nippon Kayaku Co., Ltd.)
PF656: Fluorine-based surfactant (manufactured by OMNOVA Solutions, Inc., fluorine-based surfactant)

Measurement of Refractive Index

Resin layers having a thickness of 500 nm were formed on silicon substrates by using the film-forming compositions prepared in Examples 1 to 10 and Comparative Examples 1 to 4. For each of the resin layers thus obtained, the refractive index at a wavelength of 600 nm was measured by using a spectroscopic ellipsometer (manufactured by J. A. Woollam Co., Inc., VUV-VASE). The results are presented in Table 4.

TABLE 4

|  | Refractive index |
|---|---|
| Example 1 | 1.56 |
| Example 2 | 1.57 |
| Example 3 | 1.56 |
| Example 4 | 1.59 |
| Example 5 | 1.56 |
| Example 6 | 1.56 |
| Example 7 | 1.59 |
| Example 8 | 1.59 |
| Example 9 | 1.64 |
| Example 10 | 1.70 |
| Comparative Example 1 | 1.59 |
| Comparative Example 2 | 1.56 |
| Comparative Example 3 | 1.56 |
| Comparative Example 4 | 1.57 |

Evaluation of Imprint

Each of the film-forming compositions prepared in Examples 1 to 10 and Comparative Examples 1 to 4 was applied on a polycarbonate substrate or a polymethyl methacrylate substrate, which both measured 5 cm on each side, by using a spin coater, and thus a coating layer having a thickness of 10 μm was obtained. Subsequently, a mold prepared by applying a mold releasing agent on the surface of a glass plate was pressed against the coating layer, and the coating layer was exposed at a dose of 500 mJ/cm$^2$ while in that state. After exposure, the mold was released, and the fillability into the mold, adhesiveness, and curability were evaluated. In regard to the evaluation of fillability into the mold, the case in which when the mold was pressed the liquid penetrated into the mold pattern was rated as (+). In regard to the evaluation of adhesiveness, the case in which the pattern definitely remained on the substrate at the time of mold release was rated as (+); and the case in which the film peeled off the substrate was rated as (−). In regard to the evaluation of curability, the case in which the film was cured by UV irradiation, tackiness disappeared, and pattern transfer could be reliably carried out, was rated as (+); and the case in which, since curing was insufficient and tackiness remained, the liquid adhered to the mold, or pattern collapse occurred, was rated as (−). The results are presented in Tables 5 and 6.

TABLE 5

|  | Fillability into mold | Polycarbonate substrate | |
|---|---|---|---|
|  |  | Adhesiveness | Curability |
| Example 1 | (+) | (+) | (+) |
| Example 2 | (+) | (+) | (+) |
| Example 3 | (+) | (+) | (+) |
| Example 4 | (+) | (+) | (+) |
| Example 5 | (+) | (+) | (+) |
| Example 6 | (+) | (+) | (+) |
| Example 7 | (+) | (+) | (+) |
| Example 8 | (+) | (+) | (+) |
| Example 9 | (+) | (+) | (+) |
| Example 10 | (+) | (+) | (+) |
| Comparative Example 1 | (+) | — | (−) |
| Comparative Example 2 | (−) | — | — |
| Comparative Example 3 | (−) | — | — |
| Comparative Example 4 | (−) | — | — |

TABLE 6

| | Polymethyl methacrylate substrate | |
|---|---|---|
| | Adhesiveness | Curability |
| Example 4 | (+) | (+) |
| Example 7 | (+) | (+) |
| Example 8 | (+) | (+) |
| Comparative Example 1 | — | (−) |

As can be seen from Tables 5 and 6, when the compositions of the Examples were used, the compositions exhibited satisfactory optical imprint properties on the resin substrates. However, in a composition which had a large amount of organic solvent (Comparative Example 1), curing was not effectively achieved, and in compositions which did not contain a monomer having a viscosity of 500 cP or less as component (A) (Comparative Examples 2 to 4), transfer of the mold pattern was achieved insufficiently.

What is claimed is:

1. A film-forming composition for optical imprint, comprising (A) a photopolymerizable monomer having a hydrophilic group, (B) inorganic nanoparticles, and (C) a photopolymerization initiator, the composition having an organic solvent content of 5 to 20% by mass, including a monomer which has a viscosity of 500 cP or less as component (A) at a proportion of 30% by mass or more relative to the total amount of component (A) and component (B), and having a refractive index after curing of 1.56 or higher as measured using light having a wavelength of 600 nm.

2. The film-forming composition according to claim 1, wherein component (A) is an acrylic monomer.

3. The film-forming composition according to claim 1, wherein component (B) comprises titanium oxide or zirconium oxide.

4. A method for producing an optical member by optical imprint lithography, the method comprising:
applying the film-forming composition according to claim 1 on a substrate to form a coating layer, and pressing a mold against the coating layer without heating;
irradiating the coating layer with ultraviolet radiation to cure the coating layer while the mold is pressed against the coating layer, thereby forming a resin layer; and
detaching the mold from the resin layer.

5. The method for producing the optical member according to claim 4, further comprising heating the resin layer after the mold is detached from the resin layer.

6. The method for producing the optical member according to claim 4, wherein the substrate is a resin substrate.

7. The film forming composition according to claim 1, including a monomer which has a viscosity of 500 cP or less as component (A) in an amount greater than or equal to 50% by mass and less than 95% by mass relative to the total amount of component (A) and component (B).

8. The film forming composition according to claim 1, including a monomer which has a viscosity of 500 cP or less as component (A) in an amount greater than or equal to 65% by mass and less than 90% by mass relative to the total amount of component (A) and component (B).

* * * * *